Patented June 17, 1941

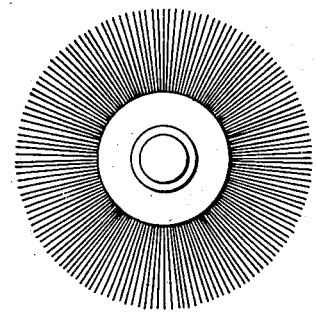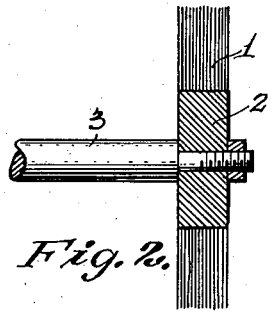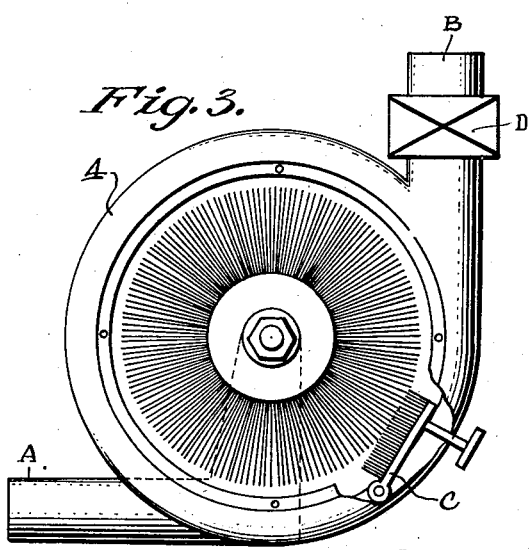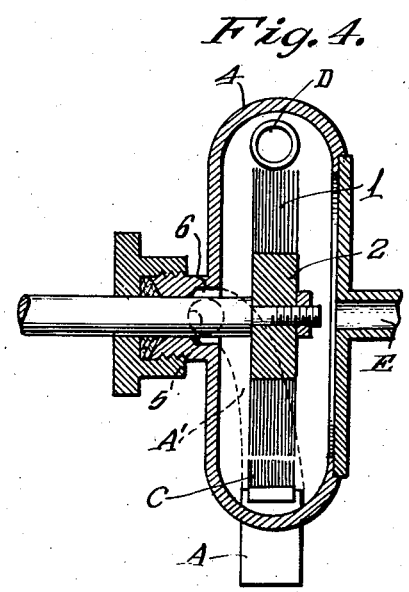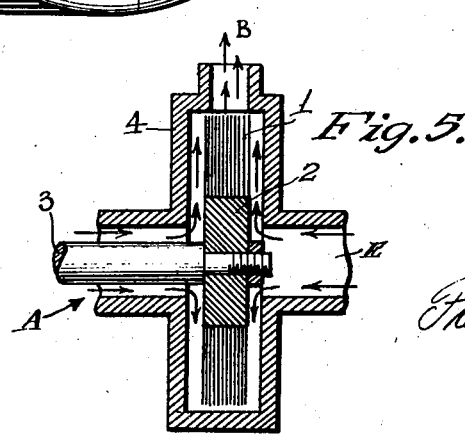

2,245,632

UNITED STATES PATENT OFFICE 2,245,632

APPARATUS FOR COMBINING CHEMICALS

Frederick W. Winkler, Newark, N. J., assignor of one-fourth to Charles H. Keel, Forest Hills, N. Y.

Application August 9, 1938, Serial No. 223,806

5 Claims. (Cl. 259—9)

This application is a continuation in part of my application Serial No. 106,493, filed October 19, 1936.

This invention relates to the treatment of two or more chemicals so as to materially help in facilitating chemical reactions and to improve the quality of chemical compounds and mixtures.

This invention in one aspect relates to an apparatus which will facilitate many chemical reactions, hitherto done only with difficulty in chemical plants and will likewise increase the efficiency of other manufacturing processes at present in use.

It is common knowledge that where two or more chemicals are desired to react with each other, it is necessary to have them in complete solution. This is not only essential toward obtaining the highest chemical efficiency but is necessary also, in order to have a pure compound as the resulting product.

As it is not always easy to dissolve the reagents necessary for a chemical reaction or to get them into some other form suitable for coupling by ordinary means, other methods are resorted to. These methods consist of the using of strong acids or alkalis or expensive solvents to achieve solution. While the main objection to this plan is the expense involved, often the harmful action resulting from the use of these additional reagents on the quality of the final product is likewise an objection.

The invention in one aspect consists of two major operations. Firstly, to thoroughly mix the products necessary for a chemical reaction, whether in or out of solution, and secondly, to submit them to the action of a device, which by simultaneously breaking them up into very fine particles and rubbing them together, will with the help of this exceptional treatment put these chemicals in a form in which combination will result even though previous complete solution had not been attained.

For the further comprehension of this invention and the objects and advantages thereof, reference will be had to the following description and accompanying drawing and to the appended claims in which the various novel features of this invention are more particularly set forth.

Figs. 1 and 2 are views of an impeller forming part of an apparatus embodying the invention;

Figs. 3 and 4 are diagrammatic views of one embodiment of the invention; and

Fig. 5 is a schematic view of an embodiment of the invention.

Referring to the drawing, Figs. 1 and 2 are diagrammatic views of an impeller element of an apparatus embodying the invention and Figs. 3 and 4 are diagrammatic views showing the mounting of the impeller element within a housing with certain of the parts broken away for convenience in illustration.

The apparatus shown consists of a disc-shaped revolving brush, fastened to a shaft, for the purpose of rotation and surrounded by a housing like that of the impeller in a centrifugal pump. In the outer edge of this housing and at the periphery of this movable brush is fixed a stationary brush with the necessary equipment for adjusting its distance from the rotating brush, from the outside of the housing.

The impeller as shown in Figs. 1 and 2 consists of a disc-shaped movable brush, embodying spines or bristles 1 suitably fastened on a central disc-like hub 2 and the hub in turn is suitably mounted on a drive shaft 3. The spines or bristles are of metal or some other suitable material, and in the particular embodiment shown the brush 1 is of substantial radial depth, being slightly larger than the radial depth of the hub 2.

Figs. 3 and 4 show the housing 4 in which the impeller revolves, with the spines or bristles of the impeller brush rotatable in close proximity to the periphery of the interior of the casing or housing. The latter may be of any suitable metal or other suitable material. There is associated with the rotary impeller brush a stationary brush C, the latter being mounted in close proximity to the periphery of the impeller brush and being adjustably mounted to enable the brush C to be adjusted toward and away from the periphery of the impeller brush.

The casing or housing for the impeller brush is provided with a main inlet A and an outlet B, while a valve or controlling device D, by which the speed of chemicals passing through this apparatus may be controlled, is provided. This controlling valve may be either a part of or may be fastened to the housing. As above described, the housing or casing is similar to that of a centrifugal pump, namely, with the intake or inlets to the chamber in which the impeller revolves being axial, while the outlet B is tangential.

The apparatus is provided with an additional inlet E, by which chemicals in the form of gases, liquids or solids in suspension may be admitted to the other chemicals passing through the apparatus while in operation. This additional inlet E, in the particular embodiment shown, is also axially disposed, which is preferred.

In operation the liquid under treatment comes from any suitable source to the inlet or inlets and is taken up with the spines or bristles revolving in close proximity to the interior of the casing and is ultimately forced out through the outlet B. The chemicals thus treated may, if desired, be recirculated back in the inlet or they may be passed on to any storage place.

As diagrammatically shown in Fig. 4, the fixed brush C is insulated from the rotating brush whereby the mixture of chemicals may be subjected to the action of an electric current passing between the two brushes.

For the purpose of operation, the position of this device may be between two vats or tanks in either an open or closed system where the chemicals being processed may be forced through this device by some outside force or may be permitted to travel through this device by the force of the centrifugal pressure developed by the revolving brush; or the device or apparatus may, as indicated, take the chemical from a tank and after treatment return the same thereto for repeated treatments if desired. At the same time any suitable chemical or substance to which the chemicals under treatment are to be subjected is introduced into the casing through the inlet E.

Preferably the adjustable stationary brush C having spines or bristles of metal or other suitable material is adjusted to a position in close proximity to the periphery of the revolving brush, as shown in Figs 3 and 4 and as described above.

This device when in operation imparts to chemicals in solution, or in suspension, in a vehicle, a simultaneous mixing, cutting and rubbing action which greatly facilitates any possible chemical reaction. This is effected according to my invention without necessitating the use of harmful additional and expensive reagents and, moreover, the chemical reaction desired is effected in a shorter time and with greater efficiency than is possible according to prior practice. The housing or casing closely surrounding the spines or bristles retains the chemicals under treatment in close association with the impeller brush and the bristles. The result is a mixing, cutting and rubbing action of the chemicals to be mixed and combined which greatly facilitates not only the mixing but the actual chemical reactions.

Fig. 5 illustrates schematically by arrows the paths of flow of the different chemicals coming in through the intakes A and E. The impeller action of the hub disc 2 with the spines 1 draws the chemicals in through the intakes A and E, throws the chemicals radially outward along the sides of the disc by centrifugal force and the impelling action, and after the treatment within the casing 4, above described, impels the treated compound, solution or mixture out through the outlet B. Preferably the impeller is rotated at a very high speed to enhance the combined impelling and treating action within the casing.

In Figs. 3 and 4 the intake A is indicated as having an extension A' leading to an opening 5, which in turn leads into the annular chamber 6 about the shaft 3 providing for the axial inlet of the materials. The following are some of the many possible uses and practices of the invention.

Many chemical compounds that are formed as precipitates by the addition of one chemical to another while agitating, often contain quantities of either of the components in the finished product, not combined and therefore constituting an adulterant. This is due to the finished material surrounding some of the uncombined components, in other words, occlusion. A case of this kind is illustrated in the manufacture of calcium carbonate. The chemical reaction is as follows:

$$Ca(OH)_2 + CO_2 + H_2O = CaCO_3 + 2H_2O$$

The resulting calcium carbonate ($CaCO_3$) when produced according to common practice, varies considerably in alkalinity as some of the finished calcium carbonate encloses some of the highly alkaline calcium hydroxide [$Ca(OH)_2$] unacted upon. For many purposes such a product is not suitable. Excellent results as to particle size and neutrality are obtained with my machine, by passing the $CO_2$ into the second axial intake while circulating the milk of lime through the machine.

The resulting material is completely combined and of such fineness and uniformity of particle size that no further colloiding or separation into sizes is required.

This machine anticipates the colloiding machine by forming particles of extreme fineness during the process of creating the compound itself.

Another practice or use of the invention is in the preparation of aluminum hydroxide from aluminum sulphate and sodium carbonate. The aluminum sulphate may be neutralized with sodium carbonate in any suitable manner, as for example in the old or open vessel stirring apparatus. Turkey red oil is also added and then the batch thus formed is circulated and treated through the housing 4 by admission at the intake A and by the exit through the outlet B. During the circulation the intake E is open to the air and by the suction of the impeller the emulsion is aerated during the circulation. During this treatment the intake A may be connected with the pump of the tank containing the batch while the outlet B leads into the top of the tank containing the batch. On stopping the brush impeller the gelatinous mass rises and separates itself from the water. This behavior is just the opposite to that in the old method where the gelatinous mass, due to gravity, falls out of solution.

This new way, through aeration of the emulsion is much faster in its separation from the water, and the sodium sulphate which we are trying to eliminate by drawing off of the original water, is gotten rid of much sooner.

The procedure therefore is to permit the emulsion to rise to its maximum and then draw off the sodium sulphate water. Now substitute an amount of fresh water equal to that of the sodium sulphate water drawn off and repeat the previous operation.

This is continued until a test with barium chloride shows no more sodium sulphate as being present.

In the purification of crude gasoline, one of the treatments consists of subjecting this gasoline to a so-called doctor solution. This doctor solution is made from caustic soda and lead oxide. The function of this lead oxide is to react with the evil smelling sulphur compounds in the gasoline by uniting with them to form lead sulfid. This lead sulfid is very heavy and therefore easily gotten rid of by settling. As the continued loss of the lead oxide in the form of lead sulfid would be a heavy expense to the refineries, they have hit on a scheme of recovery which is being used at present. This consists of processing the lead sulfid by agitating with air in caustic solution. The result is the conversion of the lead sulfid back to lead oxide, a process called regeneration.

My brush impeller by comparative test has shown up to be about 25% better than the best machine now on the market.

The procedure with the brush impeller is to admit air at the reaction chemical entrance E, while circulating the lead sulfid caustic soda solution through a system, part of which is my brush impeller. The air taken in through the opening E oxidizes the lead sulfid back to lead oxide while converting the sulphur to sodium hyposulfate, which is an inert chemical to this process.

A process best describing one phase of the invention is illustrated in the making of insoluble pigments, or lakes, from soluble dyes by the addition of some soluble metallic salt to the color in solution, whereby the insoluble pigment or lake of that color is formed.

One method at present is to put some water into a vat and dissolve in it some color by the use of agitation and heat. Some barium chloride or calcium chloride is then dissolved and under proper conditions of heat and agitation is slowly added to the dissolved color in the vat.

Particle size is the all important factor in the making of these lakes, as the rubbing up with varnish gives the smoothest paints only when the ultimate in fineness of particles is reached. Vigorous agitation is always stressed in these procedures and as I have described the limitation of open vat agitation in my earlier remarks it is more or less obvious that better results are possible only with a new type of agitating device. This brings up again the brush impeller method.

In the practice of my invention the dissolved color is put into container #1 and circulated through the impeller brush housing while the slow adding of barium chloride or some other soluble metallic salt in solution is done at the reaction chemical entrance E.

By thus forcing the reaction chemical into the emulsified color solution at the periphery of the brush an exceedingly fine particle of the pigment results, producing a paste which when rubbed up with varnish gives a much smoother ink than can be obtained in any other way.

Another application of the invention is shown in the treatment of gasoline with sulfuric acid. The conventional practice at present consists of circulating crude gasoline through a system containing two or three cone-shaped agitator equipped reservoirs or tanks, which contain 66° sulfuric acid.

According to my invention just enough sulfuric acid to fill the housing of the brush impeller is used and the action of the rotating brush forces gasoline entering at A out of the exit B, this circulation continuing until the proper degree of treatment has been received, by test. The vigorous attrition effect received by the gasoline in its path through this brush impeller shortens the period of contacting required and permits the use of a smaller amount of sulfuric acid. Added to this is a simultaneous oxidation effected by slightly cracking the valve on the reaction chemical opening E and permitting air to enter at this point.

In the original manner of treating gasoline with sulfuric acid all the agitation was done with compressed air. Recently the circulating and agitation has been done with rotary pumps. The use of my brush impeller combines some of the best qualities of both methods. The aeration entrance E makes possible the use of air toward assisting the oxidizing effect being carried on by the sulfuric acid while the attrition effect of the brush tends toward economy in sulfuric acid.

Another illustration is the application of the brush impeller to electrolysis. The specific example under consideration is benzidine from nitro benzol, but I do not want to be limited thereto, as all types of oxidation and reduction will be helped by my brush impeller apparatus.

The application of my invention to this type of work is part of a simple system wherein the processed materials are circulated from the tank through A and out of B back to the tank while oxygen, hydrogen or some other gas is admitted at the chemical reaction entrance E.

It is necessary for this work to have the stationary adjustable insulated brush, in the approximate location shown in the drawing.

It is of course understood that the oxygen or hydrogen gases mentioned above are used in addition to the electric current.

Another illustration is the manufacture of a chemical used in the dyeing industry and named Naphtol AS–SW.

An attrition machine is usually employed consisting of an agitated closed iron kettle and the process is essentially as follows. Beta naphthyl amine and beta oxy naphthoic acid, both in powdered form are put into this iron kettle into a vehicle of naptha. Phosphorous trichloride in liquid state is added and the kettle closed and agitated while heating at 110° C. for a period of about 8 hours.

Beta napthylamine and beta oxy naphthoic acid are only slightly soluble in the naphtha and so the process of condensing these two chemicals into the final product called napthol AS–SW, is a very slow one and only about 65% efficient. When these chemicals are subjected to treatment by my invention the time period is considerably shorter and the efficiency of combination at least 15% higher. In the manufacture of this chemical according to my invention the chemical material is taken from the conventional steam jacketed kettle, drawn into the intake A, treated within the casing 4, expelled out through the outlet B and led back to the kettle, and the cycle is repeated as long as is desired. The manufacture according to my invention makes the yield much higher and, moreover, the time cycle is substantially shortened.

Another illustration is the manufacture of naphtol AS. The procedure here is similar to that described above in connection with the manufacture of naphtol AS–SW with the exception that in place of B-naphthylamine, a solid, aniline, an oil, is used. Here again the emulsifying principle of the apparatus including the brush impeller with the bristles disposed closely to the housing and the axial intake play an important role. The time factor may be reduced to two-thirds the former time and the efficiency is at least from ten to twelve per cent higher.

While I have illustrated and described my invention with some degree of particularity, I realize that in practice various alterations therein may be made. I, therefore, preserve the right and privilege of changing the form of the details of construction and of otherwise altering the arrangement of the correlated parts, without departing from the spirit or scope of the appended claims. It is understood, of course, that the fixed brush, when used, must be mounted upon an insulating material to insulate it from the rotating brush in order to subject the materials to the action of an electric current while being processed, this insulation being omitted from the drawing for convenience in illustration.

The subject matter of the method of processes herein set forth will be claimed in other applications.

Having thus described my invention, what I claim as new and desire to secure by United States Letters Patent is:

1. An apparatus of the character set forth consisting of a rotating brush, a housing closely surrounding said brush, and a fixed brush, the fixed brush being set in an insulating material and thus insulated from the rotating brush, for the purpose of subjecting a mixture of chemicals to the action of an electric current while undergoing treatment by said brush, and means for introducing a chemical into said casing.

2. A machine of the character set forth comprising a brush disc impeller having a periphery of flexible bristles of relatively large depth, a housing closely surrounding the entire periphery of said impeller, a pair of axial inlets on opposite sides of the impeller arranged to introduce chemicals against the opposite surfaces of the impeller, a tangential outlet, and means for controlling the flow through the machine, said impeller functioning both to treat and to propel the chemicals through the machine.

3. A machine of the character set forth comprising a disc-shaped impeller brush of spines or bristles firmly fastened in a central hub, a housing for said impeller brush closely surrounding the entire periphery thereof, a pair of inlets leading to the opposite sides of said impeller brush arranged to introduce two different chemicals against the opposite plane surfaces of the impeller hub, said chemicals being forced radially outward along the sides of the impeller to the periphery of the brush impeller by the impeller action thereof to be acted upon by the brush spines, a tangential outlet for said housing, and means for regulating the flow therethrough, said impeller functioning both to treat and propel the chemicals outwardly along the sides of the disc and through the machine.

4. In a machine of the character set forth in claim 3 wherein the brush has a radial depth approximating the radius of the hub.

5. A machine for treating and combing chemicals comprising a rotary disc-like impeller element having a periphery of spines, a housing for said impeller element surrounding the periphery thereof and forming with the periphery an annular chamber for the reception and treatment of chemicals, a pair of inlets leading to the opposite sides of said impeller element and arranged to introduce two different chemicals against the opposite side surfaces thereof, said chemicals being forced radially outward along the sides to the periphery of the impeller by the impeller action thereof and said spines performing a mixing, cutting and rubbing action on the chemicals, a tangential outlet for said housing and means for regulating the flow therethrough, said impeller functioning both to treat and propel the chemicals outwardly along the sides of the disc and about the periphery thereof and through the machine.

FREDERICK W. WINKLER.